Figure 1:
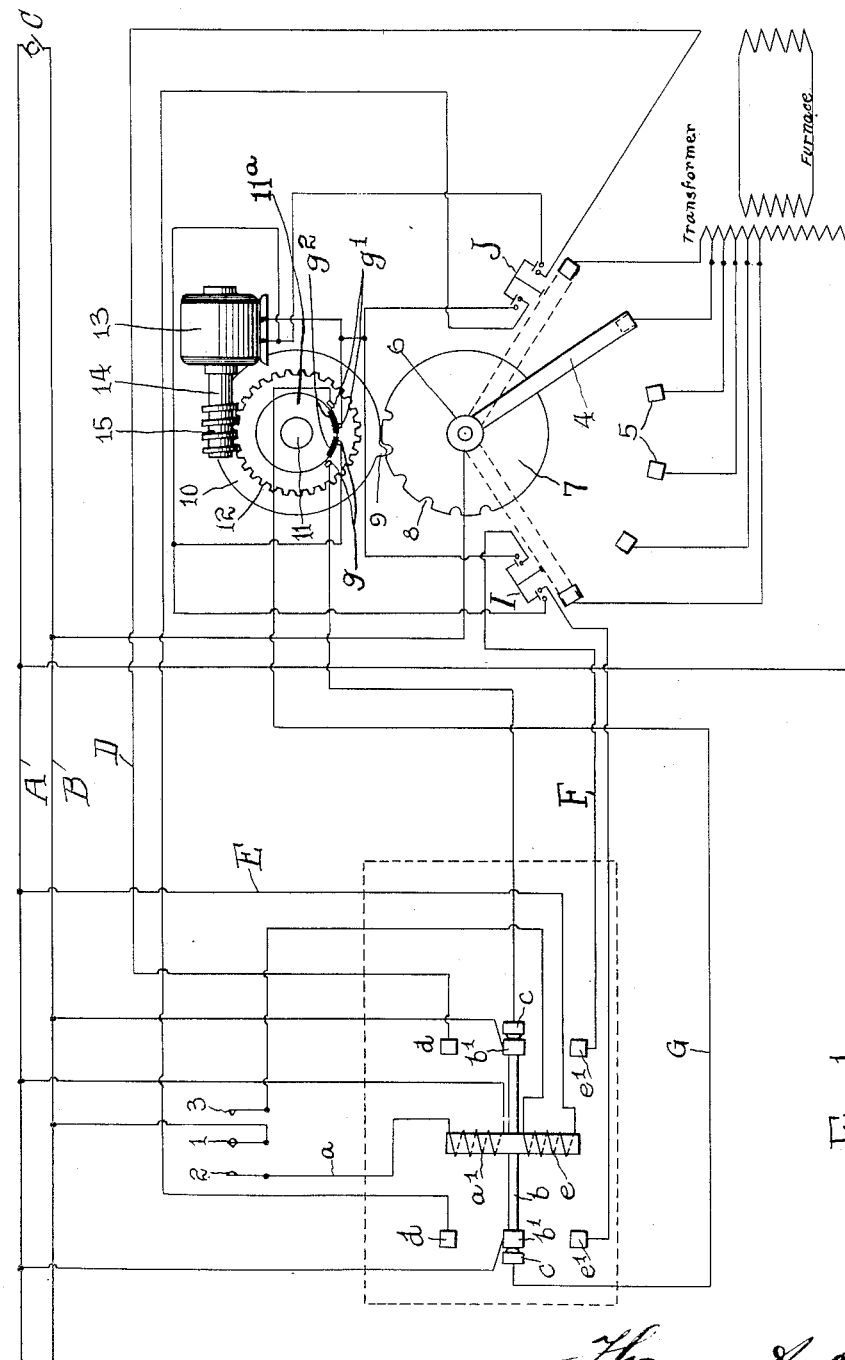

Mar. 6, 1923.

T. A. REID 1,447,517

AUTOMATIC TEMPERATURE CONTROL MEANS FOR ELECTRIC FURNACES

Filed Aug. 6, 1920  2 sheets-sheet 1

Inventor
Thomas A. Reid
By his Attorney

Patented Mar. 6, 1923.

1,447,517

UNITED STATES PATENT OFFICE.

THOMAS ANDREW REID, OF EAST ORANGE, NEW JERSEY, ASSIGNOR TO ELECTRIC HEATING APPARATUS COMPANY, OF NEWARK, NEW JERSEY.

AUTOMATIC TEMPERATURE-CONTROL MEANS FOR ELECTRIC FURNACES.

Application filed August 6, 1920. Serial No. 401,602.

*To all whom it may concern:*

Be it known that I, THOMAS A. REID, a citizen of the United States, and resident of East Orange, in the county of Essex and State of New Jersey, have invented certain new and useful Improvements in Automatic Temperature-Control Means for Electric Furnaces, of which the following is a specification.

This invention relates to temperature control means for electrical furnaces, operable by an electro-motive force that is directly proportional to the furnace temperature, derived from a thermo-couple inserted in the furnace whereby a predetermined degree of heat may be automatically maintained in a furnace.

To this end my improvement consists in the provision of a motor with a train of drive mechanism to actuate the switch arm of a transformer or a rheostat or the rotor of an induction regulator that regulates the voltage of the current flowing to the resistance coils of the furnace, the separate circuit whereby said motor is respectively energized and de-energized including a relay system that is influenced by a pyrometer which registers the furnace temperature, and, in responding to fluctuations in the temperature, causes the relays to control the operation of the motor.

This control means is applicable either to the switch arm of a transformer or the rotor of an induction regulator when an alternating current is employed, or to the switch arm of a rheostat, where the furnace is supplied with direct current.

Other features and advantages of my invention will hereinafter appear.

Figure 2:
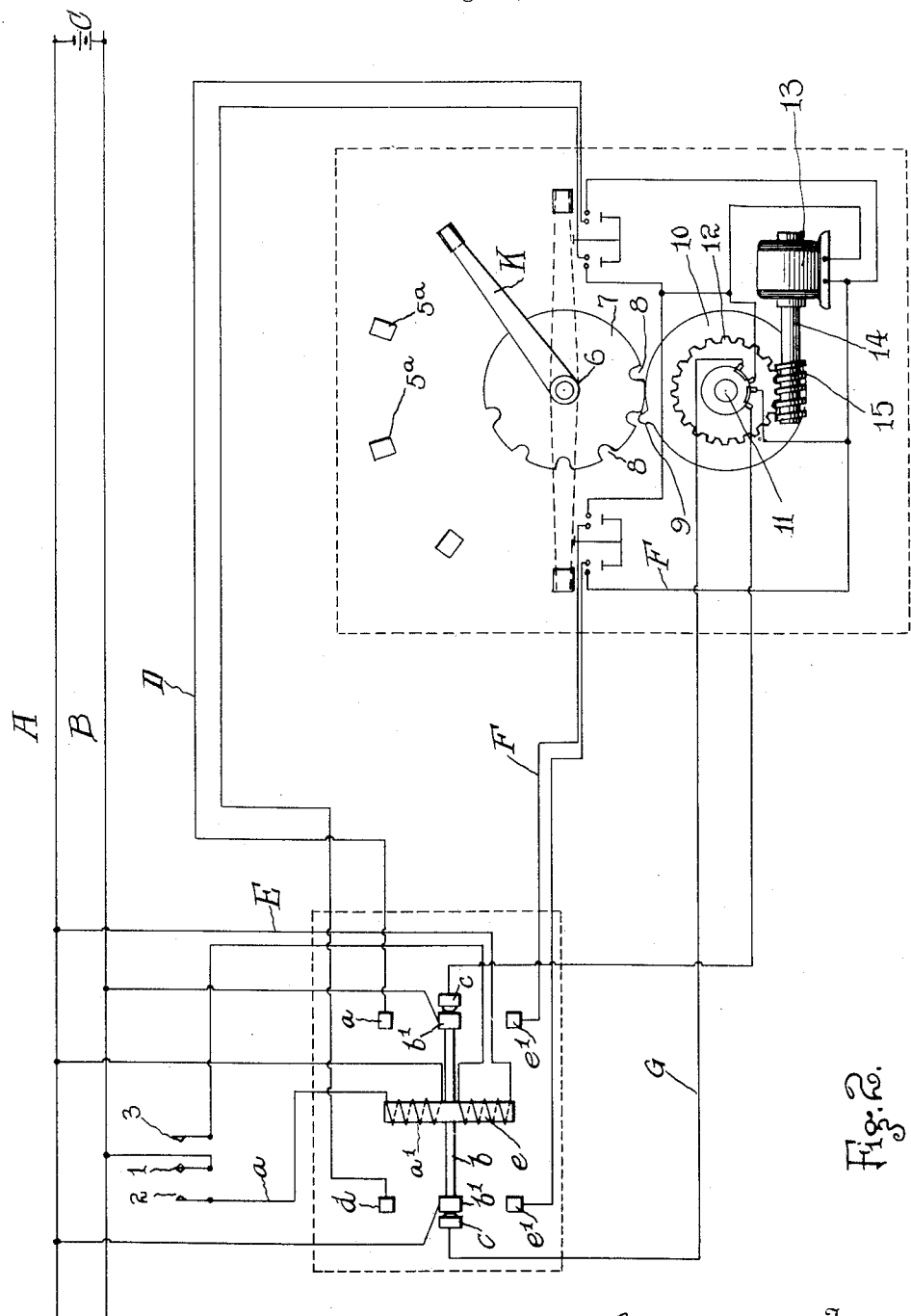

In the drawings:

Figure 1 is a diagrammatic view showing a transformer, motor control means therefor, a pyrometer, a circuit, and relays with actuating means therefor whereby the operation of said motor is governed; and Fig. 2 is a similar view of a corresponding lay-out except that a rheostat is here the controlled element.

According to Fig. 1 the contacts 1, 2 and 3 are representative of a pyrometer, including a thermo-couple, such as is employed with electrical furnaces to indicate their temperature, whereof the contact 1 is intended as a movable element whose normal, circuit-open position is set to be indicative of the pre-determined degree of furnace heat required for a particular purpose; and the elements 2, 3, are respectively stationary contacts, located at opposite sides of contact 1, to be engaged thereby respectively as the furnace temperature varies either above or below the desired degree.

Also in said figure there is shown a transformer having the switch-arm 4, and the contacts 5 representative of the different voltages in the furnace current, it being understood that the movement of the switch-arm, in its two directions for voltage varying purposes through said contacts, will according to the direction of such movement either increase or decrease the voltage.

The shaft 6 of arm 4 carries a wheel 7, having peripheral notches 8, which are engageable by a tooth 9 borne by a wheel 10, said wheel having a shaft 11 and being revoluble by means of a gear 12 that is driven by a motor 13, whose shaft 14 has a worm 15 in mesh with gear 12.

In the operation of the motor, in either direction, its worm threaded shaft causes the rotation of wheel 10, whose tooth 9 engages a notch 8 to turn wheel 7 and thus move switch arm 4 from one contact 5 to the next adjacent one, thereby causing the furnace voltage to be varied, which is the purpose I have in mind. But this voltage variation is intended by me to be a function of the rise or fall of the furnace temperature as represented by the behavior of the pyrometer and the control it exercises upon the motor.

By reference to the drawings it will be seen that the main circuit, including the line A of one sign and the line B of the other sign, having source of energy indicated at C, supplies the current for the operation of the motor. With the furnace operating at its desired or pre-determined temperature with switch arm 4 upon a contact 5, the movable pyrometer element will be normal and the motor inactive, but should a change of temperature occur in the furnace, then the contact 1 will move against either contact 2 or 3 according to whether the change be below or above normal. Assuming that due to a change in furnace temperature in one direction contact 1 has moved against contact 2, the effect will be to energize circuit $a$ including magnetic coil $a'$, causing said magnet to actuate a relay switch $b$, whose contacts $b'$ are thereby moved away from contacts *c* into engagement with contacts *d*, thus closing circuit D for the operation of the motor in one direction of its movement. Or, if the change in furnace temperature is in the other direction, so that contact 1 moves against contact 3, then the effect will be to energize circuit E, including magnetic coil *e*, causing said magnet to actuate relay switch *b* oppositely, so that its contacts *b'* are instead moved from contacts *c* into engagement with contacts *e'*, thus closing circuit F for the operation of the motor in its other direction of movement.

In the event that the switch arm 4, as actuated by the motor through the stated control means, fails in its movement to reach, or passes beyond the next adjacent contact 5, due to a premature or delayed circuit opening between contact 1 and either of the contacts 2 or 3, I provide for the further operation of the motor through circuit G, by means of the stationary contacts $g, g, g', g'$, which engage with conductive portions $g^2, g^2$, mounted in a boss 11$^a$ on shaft 11, so that the swing back to normal of contact element 1, when the contacts *b'* of relay switch *b* will have again moved back against contacts *c c*, through the deenergization of the magnet *a'* or *e* which had been energized, thus closing the circuit G, the contacts $g, g'$ will close said circuit through portions $g^2, g^2$, to thereby operate the motor within the movable range of arm 4 between adjacent contacts 5.

But when the arm 4 has reached the limit of its movement in either direction, indicated in dotted lines, the motor circuit is opened mechanically thereby, this being accomplished by means of limit switches I, J, placed in the path of said arm 4 at the opposite limits of its movement respectively, so that further travel of said arm is prevented by the cessation of current flow to the motor through the automatic opening of the switch I or J, against which the arm 4 bears when operated to the limit of its movement one way or the other.

In the example of my invention illustrated in Fig. 2 like parts therein bear the same reference numerals and characters as in Fig. 1. But in said Fig. 2 a rheostat is indicated instead of transformer, its contacts being indicated at 5$^a$ and its switch arm at K.

Variations within the spirit and scope of my invention are equally comprehended herein by virtue of the foregoing disclosure.

I claim :—

1. In a current consuming device having a single source of electrical energy, the combination of temperature controlling means comprising an electrical thermostat, a motor, means actuated by the motor for varying the voltage of current supplied to the consuming device, and means for continuing the current flow through the motor during periods of voltage variation.

2. The combination with an electrical furnace having a single source of electrical energy, of variable voltage contacts and a co-acting switch arm to control the input to said furnace without interrupting the flow of current therethrough, a pyrometer having a movable contact element and spaced stationary contact elements of opposite sign, a motor to operate said switch-arm in either direction of its movement for varying the voltage of current supplied to the furnace, a motor circuit including said pyrometer, and an independent source of energy for the control of said motor.

3. The combination with an electrical furnace having a single source of electrical energy, a circuit, and means including a movable member for varying the voltage of current supplied thereby, of a motor to actuate said voltage varying means, a motor circuit, a pyrometer included in said motor circuit, and having a movable contact under the influence of temperature changes in said furnace, and a system of relay switches whereby the motor is caused to control the voltage varying means for the purpose of maintaining a predetermined furnace temperature.

4. The combination with an electrical furnace having a single source of electrical energy, a circuit, and means including a movable member for varying the voltage of current supplied thereby, of a motor to actuate said voltage bearing means, a motor circuit, a pyrometer included in said motor circuit, and having a movable contact under the influence of temperature changes in said furnace, relay switches of opposite sign, and magnets to operate them whereby the current is caused to flow in either direction, respectively, for the rotation of the motor in its control of the voltage varying means, to maintain a predetermined furnace temperature.

5. In an electrical furnace, in combination, a resistor, a circuit therefor, means including a movable member for varying the voltage across the resistor terminals without interrupting the flow of current through the resistor, a motor to actuate said voltage varying means, a motor circuit, a pyrometer included in said circuit, and having a movable contact under the influence of temperature changes in said furnace, relay switches of opposite sign, magnets to operate them whereby the current is caused to flow in either direction, respectively, for the rotation of the motor in its control of the voltage varying means, to maintain a pre-determined furnace temperature, and auxiliary switches, operable to close the motor circuit for motor rotation when the pyrometer circuit opens leaving the voltage varying means in open circuit relation with the furnace circuit.

6. In an electrical furnace having a circuit and means including a movable member for varying the voltage of current supplied thereby, in combination, a motor to actuate said voltage varying means, a motor circuit, a pyrometer included in said circuit, and having a movable contact under the influence of temperature changes in said furnace, relay switches of opposite sign, magnets to operate them whereby the current is caused to flow in either direction, respectively, for the rotation of the motor in its control of the voltage varying means, to maintain a predetermined furnace temperature, and limit switches of opposite sign, actuable by the movable member of the voltage varying means when at the end of its movement in either direction, to open the motor circuit.

Signed at New York, in the county of New York and State of New York, this second day of August, A. D. 1920.

THOMAS ANDREW REID.